US010654461B2

(12) United States Patent
Plechey et al.

(10) Patent No.: US 10,654,461 B2
(45) Date of Patent: May 19, 2020

(54) DISTRIBUTOR VALVE

(71) Applicant: Westinghouse Air Brake Technologies Corporation, Wilmerding, PA (US)

(72) Inventors: Michael S. Plechey, Jeannette, PA (US); Jeffrey B. Skweres, McKeesport, PA (US); John Calderone, Murrysville, PA (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 0 days.

(21) Appl. No.: 15/833,420

(22) Filed: Dec. 6, 2017

(65) Prior Publication Data

US 2018/0170339 A1 Jun. 21, 2018

Related U.S. Application Data

(60) Provisional application No. 62/435,132, filed on Dec. 16, 2016.

(51) Int. Cl.
*B60T 15/32* (2006.01)
*B60T 15/02* (2006.01)
(Continued)

(52) U.S. Cl.
CPC ............ *B60T 15/021* (2013.01); *B60T 15/30* (2013.01); *B60T 15/42* (2013.01); *B60T 17/04* (2013.01); *B61H 9/00* (2013.01)

(58) Field of Classification Search
CPC ........ B60T 15/024; B60T 15/20; B60T 15/22; B60T 15/24; B60T 15/30; B60T 15/42
See application file for complete search history.

(56) References Cited

U.S. PATENT DOCUMENTS 2,215,347 A * 9/1940 Cook ...................... B60T 15/52
  303/66
3,966,269 A * 6/1976 McEathron ............. B60T 15/42
  303/37

(Continued)

FOREIGN PATENT DOCUMENTS

GB 1064697 A * 4/1967 ............ B60T 15/185
WO 9901324 A1 1/1999

*Primary Examiner* — Nicholas J Lane
(74) *Attorney, Agent, or Firm* — Christopher R. Carroll; The Small Patent Law Group LLC

(57) ABSTRACT

A brake distributor valve for a Russian railway vehicle includes a body defining a brake pipe passageway configured to be in fluid communication with a brake pipe, a reservoir passageway configured to be in fluid communication with a reservoir, and a reference pressure passageway configured to be in fluid communication with a reference pressure source. The brake distributor valve includes a service accelerated release valve having a valve member with a first position where the brake pipe passageway is isolated from the reservoir passageway and a second position where the brake pipe passageway is in fluid communication with the reservoir passageway. The valve member is configured to supply pressure from the reservoir passageway to the brake pipe passageway during a brake release event, where the valve member is actuated between the first and second positions based on a pressure within the reference pressure passageway.

19 Claims, 7 Drawing Sheets

(51) Int. Cl.
*B60T 15/42* (2006.01)
*B61H 9/00* (2006.01)
*B60T 17/04* (2006.01)
*B60T 15/30* (2006.01)

(56) References Cited

U.S. PATENT DOCUMENTS

| | | | | |
|---|---|---|---|---|
| 4,188,072 A | * | 2/1980 | Hintner | B60T 15/52 |
| | | | | 303/69 |
| 4,480,875 A | * | 11/1984 | Huber | B60T 15/42 |
| | | | | 303/38 |
| 6,663,193 B1 | * | 12/2003 | Condrasky | B60T 13/665 |
| | | | | 303/3 |

* cited by examiner ately at the head end by a compressor on the locomotive. The compressed air not only provides the pneumatic brake force at the respective cars, but also serves as a communication link via which the car's brakes are controlled from the locomotive by increasing and decreasing the brake pipe pressure. Brake equipment for railroad freight cars utilizes control valves, also known as distributor valves, to control the operation of the brake cylinders and brakes for the freight cars.

DISTRIBUTOR VALVE

CROSS-REFERENCE TO RELATED APPLICATION

This application claims priority to U.S. Provisional Application Ser. No. 62/435,132, filed Dec. 16, 2016, which is hereby incorporated by reference in its entirety.

BACKGROUND OF THE INVENTION

Field of the Invention

The present invention generally relates to a brake apparatus for railway vehicles and, more particularly, to a distributor valve for a Russian railway vehicle.

Description of Related Art

Railroad freight cars have a brake pipe that runs through each car and is coupled therebetween so as to extend continuously the length of the train. The brake pipe is charged with compressed air typically at the head end by a compressor on the locomotive. The compressed air not only provides the pneumatic brake force at the respective cars, but also serves as a communication link via which the car's brakes are controlled from the locomotive by increasing and decreasing the brake pipe pressure. Brake equipment for railroad freight cars utilizes control valves, also known as distributor valves, to control the operation of the brake cylinders and brakes for the freight cars.

Referring to FIG. 1, a prior art Russian distributor valve 1 includes a main portion 2, a pipe bracket or chamber 3, and a main-line portion 4. The pipe bracket 3 is the central portion to which the main portion 2 and the main-line portion 4 are each mounted to form the distributor valve unit. In a conventional Russian freight pneumatic braking system, there are five different operating pressures required for proper operation of the entire distributor valve unit to ensure proper pneumatic braking of a freight vehicle including: brake pipe, reservoir, working chamber, valve chamber, and brake cylinder, which are depicted via a legend in FIG. 1. The pipe bracket 3 houses a working chamber 5 and a valve chamber 6. The pipe bracket 3 is in fluid communication with a reservoir 7 and a brake cylinder 8.

On Russian railway vehicles, the control valves, such as the distributor valve units provided by MTZ and Knorr-Bremse, do not include a service accelerated release valve function. Without the service accelerated release valve function, the length of a train which can be safely operated on Russian railways is limited. The service accelerated release valve function allows the brake pipe of the train to be recharged faster, provides a reduction in the time to release a service application of the brakes, and ensures a positive release of the brakes in freight cars located in the rear of the train. With current Russian freight brake operation, effecting a full and timely release of the brake of the freight cars is problematic when controlling the train from the head end.

SUMMARY OF THE INVENTION

In one aspect, a brake distributor valve for a Russian railway vehicle includes a body defining a brake pipe passageway configured to be in fluid communication with a brake pipe, a reservoir passageway configured to be in fluid communication with a reservoir, and a reference pressure passageway configured to be in fluid communication with a reference pressure source. The brake distributor valve includes a service accelerated release valve having a valve member with a first position where the brake pipe passageway is isolated from the reservoir passageway and a second position where the brake pipe passageway is in fluid communication with the reservoir passageway. The valve member is configured to supply pressure from the reservoir passageway to the brake pipe passageway during a brake release event, where the valve member is actuated between the first and second positions based on a pressure within the reference pressure passageway.

The brake distributor valve may further include a back flow check valve in fluid communication with the reservoir passageway, with the back flow check valve configured to prevent flow from the brake pipe to the reservoir. The body may define a signal passageway configured to be in fluid communication with a signal pressure source, with the brake distributor valve further including a switching valve having a first position where the service accelerated release valve is enabled and a second position where the service accelerated release valve is disabled. The switching valve is moveable between the first position and the second position in response to the signal pressure source.

The body may define a switching passageway in fluid communication with the service accelerated release valve and an exhaust passageway in fluid communication with ambient atmosphere, where, when the switching valve is in the first position, the switching passageway is in fluid communication with the exhaust passageway. When the switching valve is in the second position, the switching passageway is in fluid communication with the brake pipe passageway. The switching valve may be a spool valve having a diaphragm, with the signal passageway in fluid communication with a first side of the diaphragm.

The reference pressure passageway may be a working chamber passageway configured to be in fluid communication with a working chamber and a working chamber reservoir in fluid communication with the working chamber passageway via a choke, with the service accelerated release valve including a first diaphragm, a second diaphragm, and a SAR check valve. The working chamber reservoir is in fluid communication with a first side of the first diaphragm, with the working chamber passageway in fluid communication with a second side of the first diaphragm and a first side of the second diaphragm. The valve member of the service accelerated release valve moves from the first position to the second position based on a pressure differential between the working chamber passageway and the working chamber reservoir. The valve member may be configured to open the SAR check valve when the valve member moves from the first position to the second position to place the reservoir passageway in fluid communication with the brake pipe passageway. The second side of the second diaphragm is in fluid communication with ambient atmosphere.

The reference pressure passageway may be a brake cylinder exhaust passageway configured to be in fluid communication with a brake cylinder, with the brake cylinder exhaust passageway in fluid communication with ambient atmosphere via a choke. The service accelerated release valve may include a diaphragm and a SAR check valve, where the valve member of the service accelerated release valve moves from the first position to the second position based on a pressure within the brake cylinder exhaust passageway. The valve member may be configured to open the SAR check valve when the valve member moves from the first position to the second position to place the reservoir passageway in fluid communication with the brake pipe passageway.

In a further aspect, a brake distributor valve for a Russian railway vehicle includes a body defining a brake pipe passageway configured to be in fluid communication with a brake pipe, a reservoir passageway configured to be in fluid communication with a reservoir, and a brake cylinder exhaust passageway configured to be in fluid communication with a brake cylinder, with the brake cylinder exhaust passageway in fluid communication with ambient atmosphere via a choke. The brake distributor valve further includes a service accelerated release valve including a valve member, a diaphragm in contact with the valve member, and a SAR check valve, with the valve member having a first position where the brake pipe passageway is isolated from the reservoir passageway and a second position where the brake pipe passageway is in fluid communication with the reservoir passageway. The valve member is configured to supply pressure from the reservoir passageway to the brake pipe passageway during a brake release event, where the valve member is actuated between the first and second positions based on a pressure within the brake cylinder exhaust passageway, and where the valve member is configured to open the SAR check valve when the valve member moves from the first position to the second position to place the reservoir passageway in fluid communication with the brake pipe passageway.

The brake distributor valve may further include a back flow check valve in fluid communication with the reservoir passageway, with the back flow check valve configured to prevent flow from the brake pipe to the reservoir. The body may define a signal passageway configured to be in fluid communication with a signal pressure source, with the distributor valve further including a switching valve having a first position where the service accelerated release valve is enabled and a second position where the service accelerated release valve is disabled. The switching valve is moveable between the first position and the second position in response to the signal pressure source.

DESCRIPTION OF THE PREFERRED EMBODIMENTS

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 1:
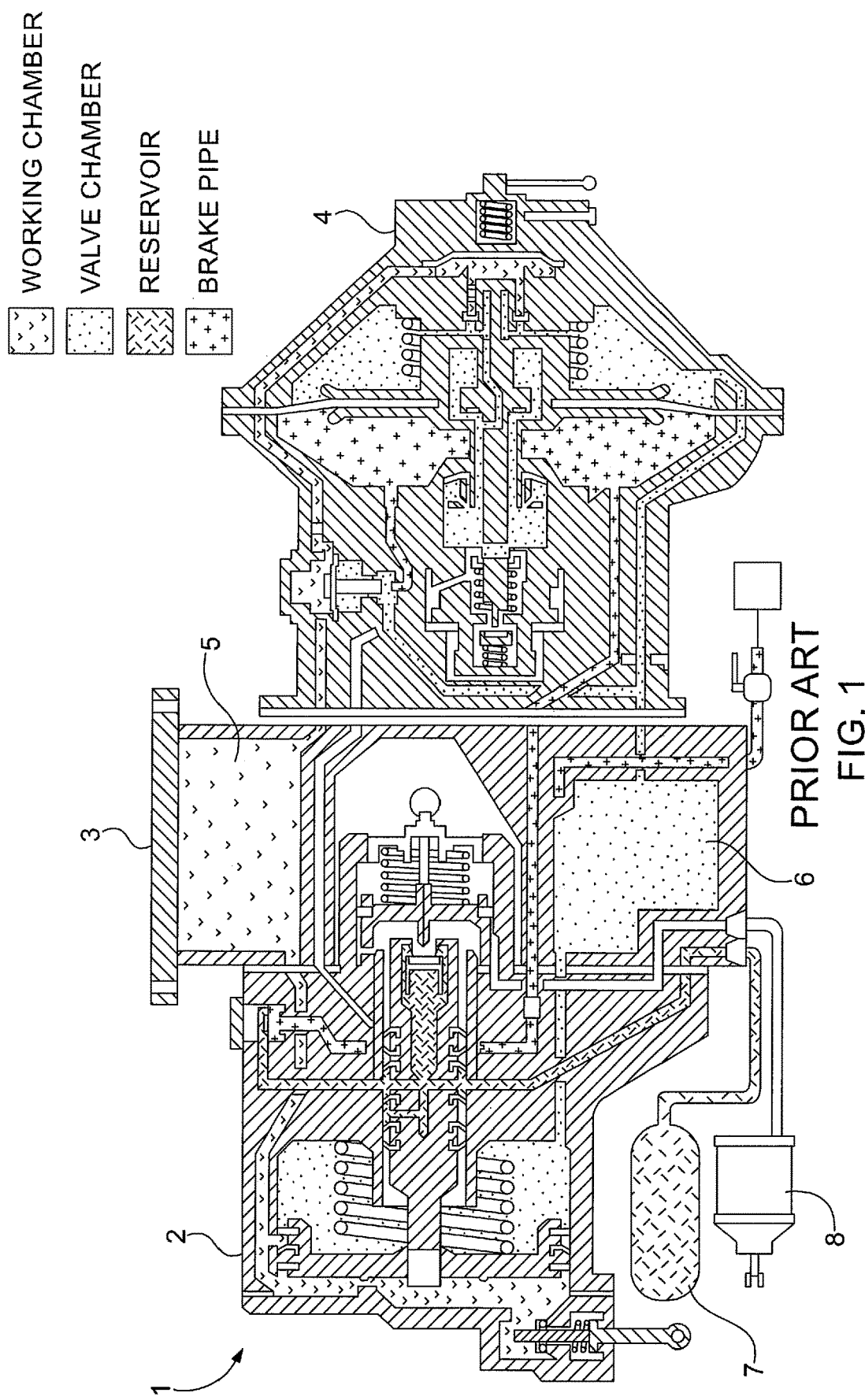
FIG. 1 is a cross-sectional view of a prior art Russian distributor valve.
Figure 2:
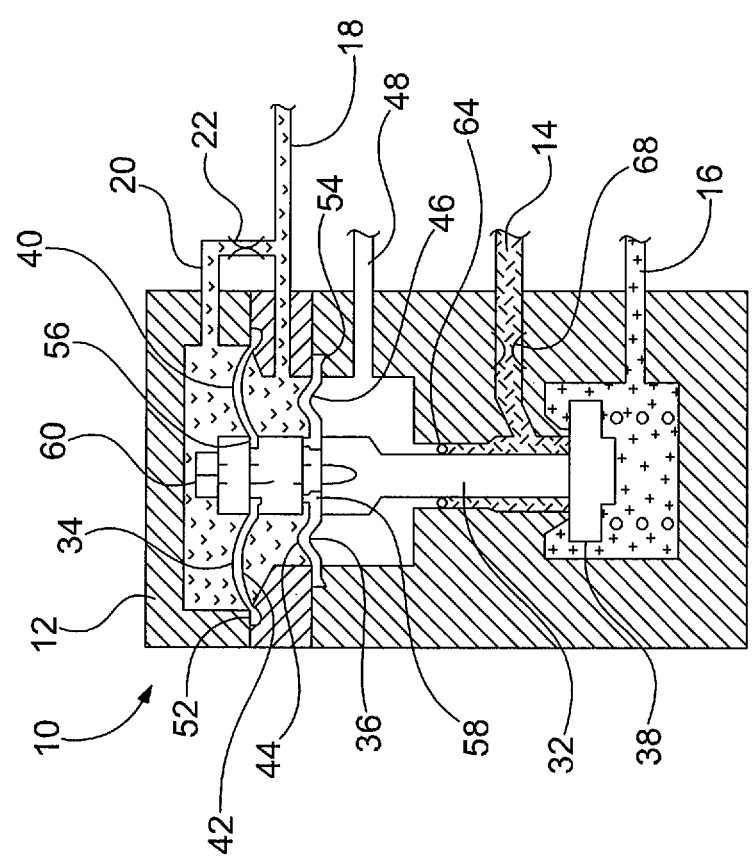
FIG. 2 is a schematic view of a service accelerated release valve according to one aspect of the present invention.
Figure 3:
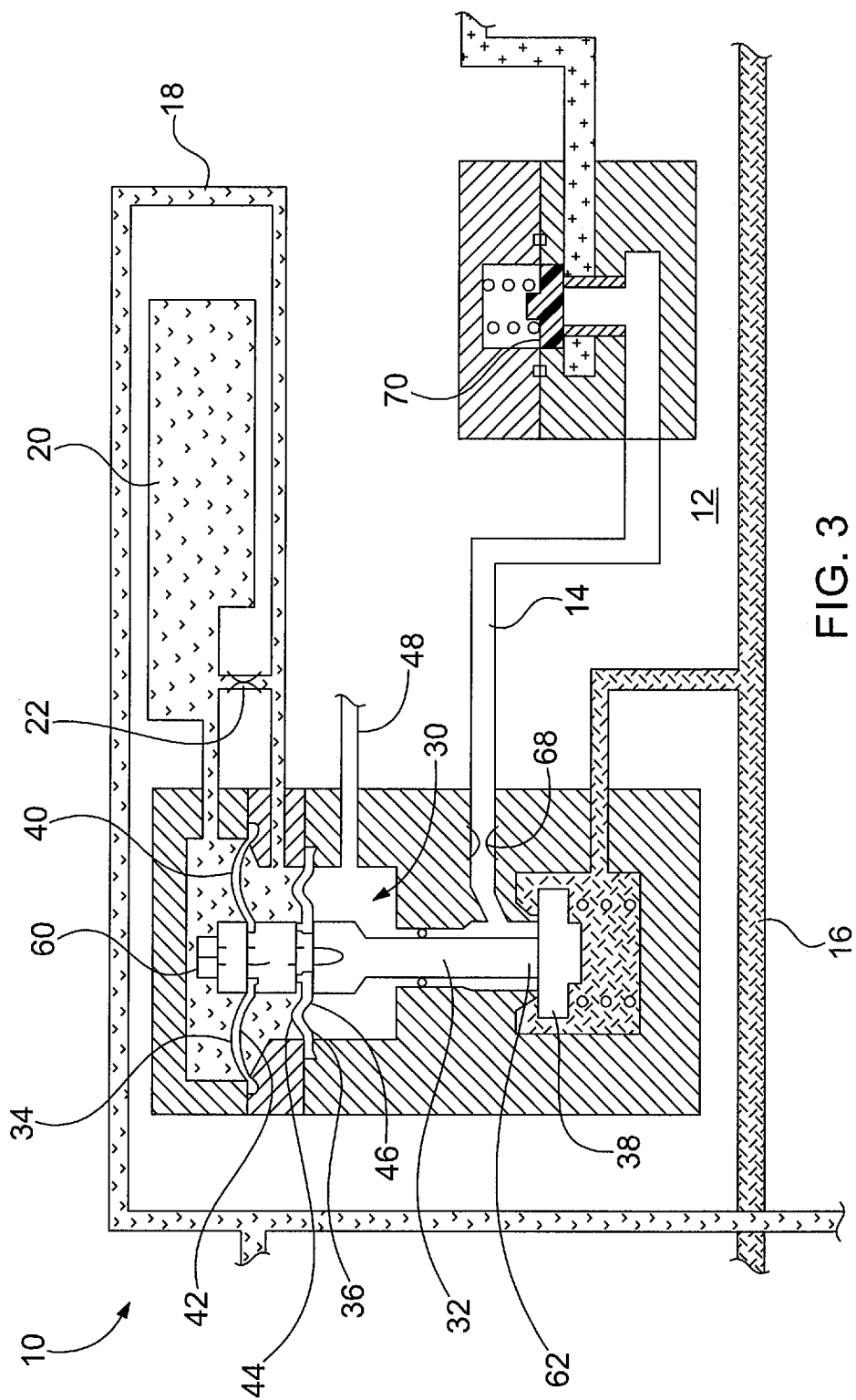
FIG. 3 is a schematic view of the service accelerated release valve of FIG. 2, further showing a back flow check valve.

Referring to FIGS. 2 and 3, a brake distributor valve 10 for a Russian railway vehicle according to one aspect of the present invention includes a body 12 defining a brake pipe passageway 14 configured to be in fluid communication with a brake pipe, a reservoir passageway 16 configured to be in fluid communication with a reservoir, a working chamber passageway 18 configured to be in fluid communication with a working chamber, and a working chamber reservoir 20 in fluid communication with the working chamber passageway 18 via a choke 22. As shown in FIG. 1, the working chamber 5 is typically provided in the pipe bracket 3, although other suitable arrangements may be utilized. The brake distributor valve 10 further includes a service accelerated release valve 30. The service accelerated release valve 30 includes a valve member 32 having a first position where the brake pipe passageway 14 is isolated from the reservoir passageway 16 and a second position where the brake pipe passageway 14 is in fluid communication with the reservoir passageway 16. The valve member 32 is configured to supply pressure from the reservoir passageway 16 to the brake pipe passageway 14 during a brake release event. The valve member 32 is actuated between the first and second positions based on a pressure differential between the working chamber passageway 18 and the working chamber reservoir 20.

Referring still to FIGS. 2 and 3, the working chamber passageway 18 and the working chamber reservoir 20 act as a reference pressure to determine when the valve member 32 is actuated between the first and second positions. More specifically, the service accelerated release valve 30 includes a first diaphragm 34, a second diaphragm 36, and a SAR check valve 38. The working chamber reservoir 20 is in fluid communication with a first side 40 of the first diaphragm 34 and the working chamber passageway 18 is in fluid communication with a second side 42 of the first diaphragm 34 and a first side 44 of the second diaphragm 36. The valve member 32 of the service accelerated release valve 30 moves from the first position to the second position based on a pressure differential between the working chamber passageway 18 and the working chamber reservoir 20. The valve member 32 is configured to open the SAR check valve 38 when the valve member 32 moves from the first position to the second position to place the reservoir passageway 16 in fluid communication with the brake pipe passageway 14. The second side 46 of the second diaphragm 36 is in fluid communication with ambient atmosphere via an exhaust passageway 48.

Outer portions 52, 54 of the first and second diaphragms 34, 36 are connected to the body 12 with inner portions 56, 58 of the first and second diaphragms 34, 36 connected to the valve member 32. The first and second diaphragms 34, 36 are provided at a first end 60 of the valve member 32 with a second end 62 of the valve member 32 engaging the SAR check valve 38. The valve member 32 includes an O-ring 64 that engages the body 12 to isolate the reservoir and brake pipe passageways 14, 16 from the exhaust passageway 48. When the pressure of the working chamber reservoir 20 is greater than the pressure within the working chamber passageway 18, a pressure differential between the first and second sides 40, 42 of the first diaphragm 34 causes the valve member 32 to move from the first position to the second position with the second end 62 of the valve member 32 engaging and opening the SAR check valve 38 to place the reservoir passageway 16 in fluid communication with the brake pipe passageway 14. A choke 68 controls the flow from the reservoir passageway 16 to the brake pipe passageway 14. The choke 22 between the working chamber reservoir 20 and the working chamber passageway 18 controls the time the service accelerated release valve 30 is open. The service accelerated release valve 30 may be incorporated into a main portion of the distributor valve 10.

Referring to FIG. 3, the distributor valve 10 further includes a back flow check valve 70 in fluid communication with the reservoir passageway 16 when then the SAR check valve 38 is in the open position. The back flow check valve 70 is configured to prevent flow of air from the brake pipe to the reservoir. The back flow check valve 70 is provided along the brake pipe passageway 14 of the body 12 such that, when the SAR check valve 38 is open, air flowing from the reservoir passageway 16 causes the back flow check valve 70 to open thereby allowing air to flow from the reservoir to the brake pipe. Providing air from the reservoir to the brake pipe increases the pressure within the brake pipe to reduce the service brake release times and ensures the positive release of the brakes in freight cars located in the rear of the train. Accordingly, the service accelerated release valve 30 and the back flow check valve 70 work together to perform the accelerated release function.

The distributor valve 10, particularly the main-line portion, may include a direct release mode (plain mode) and a graduated release mode (hilly mode). In the direct release mode, the brake cylinder pressure exhausts to atmosphere during release of the brakes and the pressure within the working chamber decreases and equalizes with the brake pipe and valve chamber pressures during the release operation. In the graduated release mode, the brake cylinder pressure exhausts a predetermined amount depending upon how much brake pipe pressure is increased with the working chamber pressure being fully retained and not decreasing during the release operation. The service accelerated release valve 30 will allow reservoir pressure to flow into the brake pipe during a recharge when the distributor valve 10 is in the direct release mode to aid in the recharge of brake pipe through the train. This feature is nullified when the distributor valve 10 is in graduated release mode. Thus, the service accelerated release valve 30 will provide for shorter brake pipe recharge times and faster brake releases when the distributor valve 10 is in direct release mode.

During charging, brake pipe pressure flowing to the service accelerated release valve 30 first flows to the top side of the back flow check valve 70, which is closed because of the spring force blocking the brake pipe pressure from flowing through to the accelerated release valve 30. At the same time, the pressure from the reservoir flows via the reservoir passageway 16 to the bottom side of the SAR check valve 38, which is closed due to the spring force of the SAR check valve 38. While the SAR check valve 38 is closed, the reservoir pressure cannot flow past the seat into the brake pipe passageway 14. Unrestricted (no choke) working chamber (18) air flows to the service accelerated release valve 30 into a port feeding the second side 42 of the first diaphragm 34 and the first side 44 of the second diaphragm 36. The working chamber air also flows through the choke 22 into the working chamber reservoir 20 and through a port feeding the first side 40 of the first diaphragm 34. Once fully charged, the working chamber pressure is equal on the first and second sides 40, 42 of the first diaphragm 34 and on the first side 44 of the second diaphragm 36. The spring force from the SAR check valve 38 and the pressure from the reservoir via the reservoir passageway 16 hold the SAR check valve 38 on its seat to keep the service accelerated valve 30 in the first position. The spring force of the SAR check valve 38 must be strong enough to keep the SAR check valve 38 closed in all working chamber, reservoir, and brake pipe pressure conditions.

During brake pipe reductions, the choke 22 between the working chamber passageway 18 and the working chamber reservoir 20 is large enough to not create a sufficient pressure differential between the working chamber passageway 18 and the working chamber reservoir 20 to open the service accelerated release valve 30.

During brake releases, with the distributor valve 10 or main-line portion of the distributor valve 10 in direct release mode, the drop in working chamber pressure creates a pressure differential between the working chamber passageway 18 and the working chamber reservoir 20 due to the choke 22, which causes the pressure acting on the first side 40 of the first diaphragm 34 to be larger than the pressure acting on the second side 42 of the first diaphragm 34. This pressure differential causes the valve member 32 of the service accelerated release valve 30 to move downward from the first position to the second position, which causes the SAR check valve 38 to open thereby allowing pressure from the reservoir via the reservoir passageway 16 to flow to the brake pipe passageway 14 and to the back flow check valve 70. Because the reservoir pressure is higher than brake pipe pressure, at this time, the reservoir pressure will lift the back flow check valve 70 off of its seat and allow reservoir pressure to flow directly back into brake pipe. If the reservoir pressure was lower than the brake pipe pressure, the service accelerated release valve 30 would still move to the second position to open the SAR check valve 38, although the back flow check valve 70 would not open due to the brake pipe pressure acting on the top of the back flow check valve 70 being higher than the reservoir pressure. Once the reservoir pressure almost equalizes with brake pipe pressure, the back flow check valve 70 will close thereby preventing the flow of reservoir pressure to the brake pipe. The valve member 32 of the service accelerated release valve 30 will also move back from the second position to the first position when the differential between the working chamber passageway 18 and the working chamber reservoir 20 equalizes to allow the spring force from the SAR check valve 38 to move the valve member 32 upwards.

During brake releases with the distributor valve 10 in graduated release mode, the working chamber pressure does not drop until the distributor valve 10 goes to full release, which occurs when the brake pipe pressure reaches approximately 2.7 psi below the full recharge pressure setting of the system. Because the pressure within the working chamber reservoir 20 and the working chamber passageway 18 does not drop, a pressure differential between the working chamber passageway 18 and the working chamber reservoir 20 is not created across the choke 22 such that the valve member 32 of the service accelerated release valve 30 will not move from the first position to the second position.

Referring to FIGS. 4-7, a brake distributor valve 110 for a Russian railway vehicle according to a further aspect of the present invention includes a body 112 defining a brake pipe passageway 114 configured to be in fluid communication with a brake pipe, a reservoir passageway 116 configured to be in fluid communication with a reservoir, and a brake cylinder exhaust passageway 118 configured to be in fluid communication with the exhaust port of valve 208, which is discussed below. The brake distributor valve 110 further includes a service accelerated release valve 130. The service accelerated release valve 130 includes a valve member 132 having a first position where the brake pipe passageway 114 is isolated from the reservoir passageway 116 and a second position where the brake pipe passageway 114 is in fluid communication with the reservoir passageway 116. The valve member 132 is configured to supply pressure from the reservoir passageway 116 to the brake pipe passageway 114 during a brake release event. The valve member 132 is actuated between the first and second positions based on a pressure within the brake cylinder exhaust passageway 118.

Referring again to FIGS. 4-7, the brake cylinder exhaust passageway 118 is in fluid communication with ambient atmosphere via a choke 134. The service accelerated release valve 130 includes a diaphragm 136 and a SAR check valve 138. The valve member 132 is configured to open the SAR check valve 138 when the valve member 132 moves from the first position to the second position to place the reservoir passageway 116 in fluid communication with the brake pipe passageway 114. The body 112 also defines a signal passageway 140 configured to be in fluid communication with a signal pressure source. In one embodiment, the signal pressure source is brake pipe pressure, although other suitable pressure sources and arrangements may be utilized. The brake distributor valve 110 further includes a switching valve 144 having a first position where the service accelerated release valve 130 is enabled and a second position where the service accelerated release valve 130 is disabled. The switching valve 144 is moveable between the first and second positions in response to the signal pressure source. The body 112 also defines a switching passageway 146 in fluid communication with a second side 148 of the diaphragm 136 of the service accelerated release 130. The body 112 further defines an exhaust passageway 150 in fluid communication with ambient atmosphere. When the switching valve 144 is in the first position, the switching passageway 146 is in fluid communication with the exhaust passageway 150. When the switching valve 144 is in the second position, the switching passageway 146 is in fluid communication with the brake pipe passageway 114. The switching valve 144 includes a spool valve 152 having a diaphragm 154 with the signal passageway 140 in fluid communication with a first side 156 of the diaphragm 154 of the switching valve 144.

As discussed above in connection with the distributor valve 10 shown in FIGS. 2 and 3, the distributor valve 110 of FIGS. 4-7 includes a direct release mode and a graduated release mode. When the distributor valve 110 is in direct release mode, the signal pressure source is fed to the signal passageway 140 and to the first side 156 of the diaphragm 154 of the switching valve 144 causing the spool valve 152 to move downward to block the connection of the brake pipe passageway 114 to the second side 148 of the diaphragm 136 of the service accelerated release valve 130. In particular, with the distributor valve 110 in direct release mode and with the spool valve 152 in the first position, the second side 148 of the diaphragm 136 of the service accelerated release valve 130 is connected to ambient atmosphere via the exhaust passageway 150 to allow the service accelerated release valve 130 to be piloted by the brake cylinder exhaust pressure via the brake cylinder exhaust passageway 118, as discussed in more detail below. When the distributor valve 110 is in graduated release mode, the signal pressure source is not fed to the signal passageway 140 such that a switching spring 160 forces the spool valve 152 upward to the second position to place the switching passageway 146 in fluid communication with the brake pipe passageway 114. With the spool valve 152 in the second position, brake pipe pressure is fed to the second side 148 of the diaphragm 136 of the service accelerated release valve 130 via the switching passageway 146 to disable the function of the service accelerated release valve 130.

Figure 6:
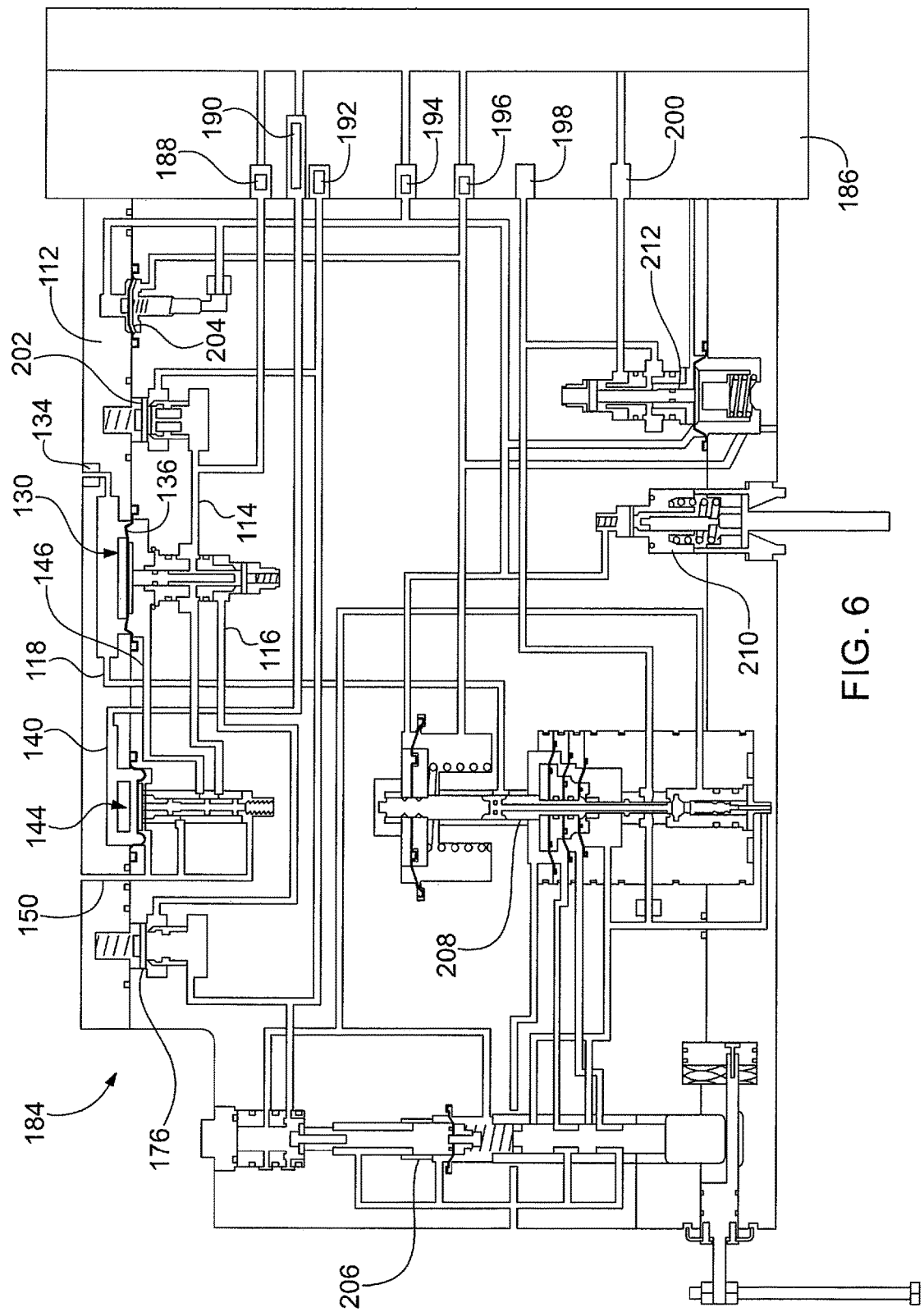
FIG. 6 is a schematic view of a main portion of a distributor valve according to one aspect of the present invention.
Figure 7:
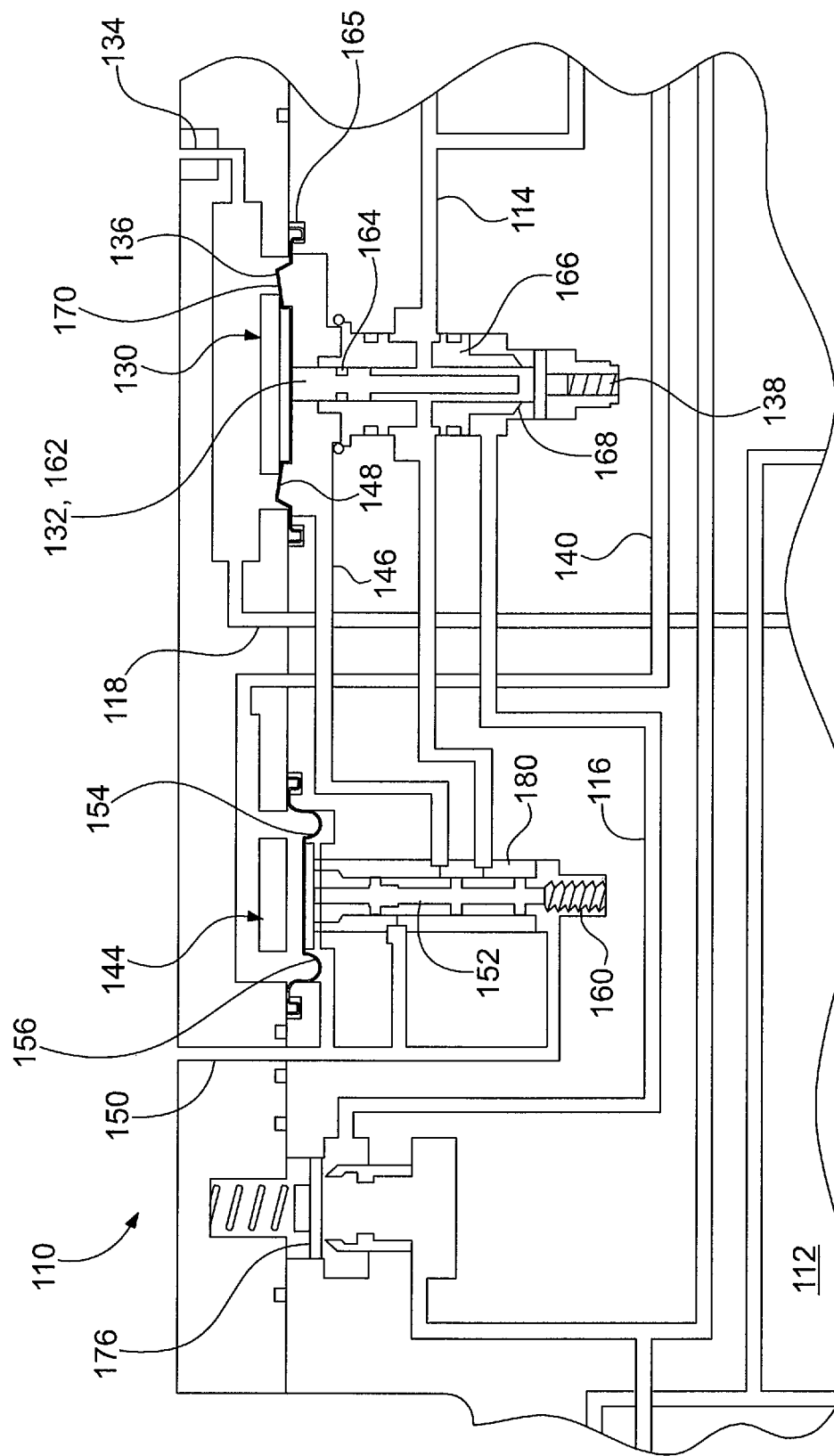
FIG. 7 is an enlarged view of the main portion of FIG. 6.

Referring to FIGS. 6 and 7, the valve member 132 of the service accelerated release valve 130 is a piston stem 162 having an O-ring 164 that is in contact with the diaphragm 136. An outer portion 165 of the diaphragm 136 is connected to the body 112. The piston stem 162 is received by a bushing 166 having a valve seat 168 for the SAR check valve 138 with the O-ring 164 of the piston stem 162 engaging the inside of the bushing 166. During a brake release, brake cylinder exhaust pressure will feed a first side 170 of the diaphragm 136 of the service accelerated release valve 130 via the brake cylinder exhaust passageway 118. The exhaust choke 134 is sized to allow for a predetermined increase in pressure buildup on the first side 170 of the diaphragm 136 of the service accelerated release valve 130, which will move the valve member 132 from the first position to the second position. When the valve member 132 is moved to the second position, the valve member 132 unseats the SAR check valve 138.

Figure 4:
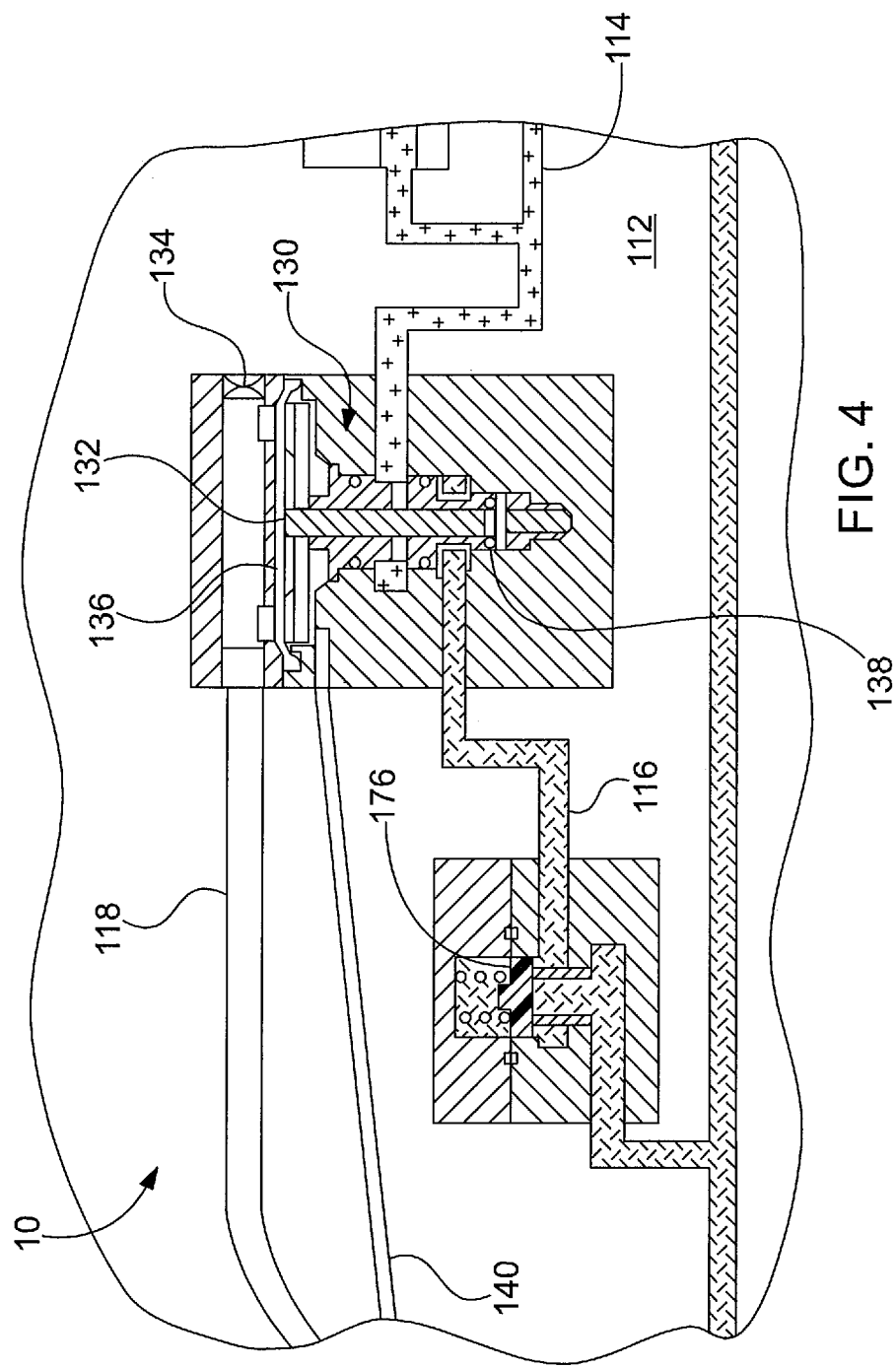
FIG. 4 is a schematic view of a service accelerated release valve according to a further aspect of the present invention.
Figure 5:
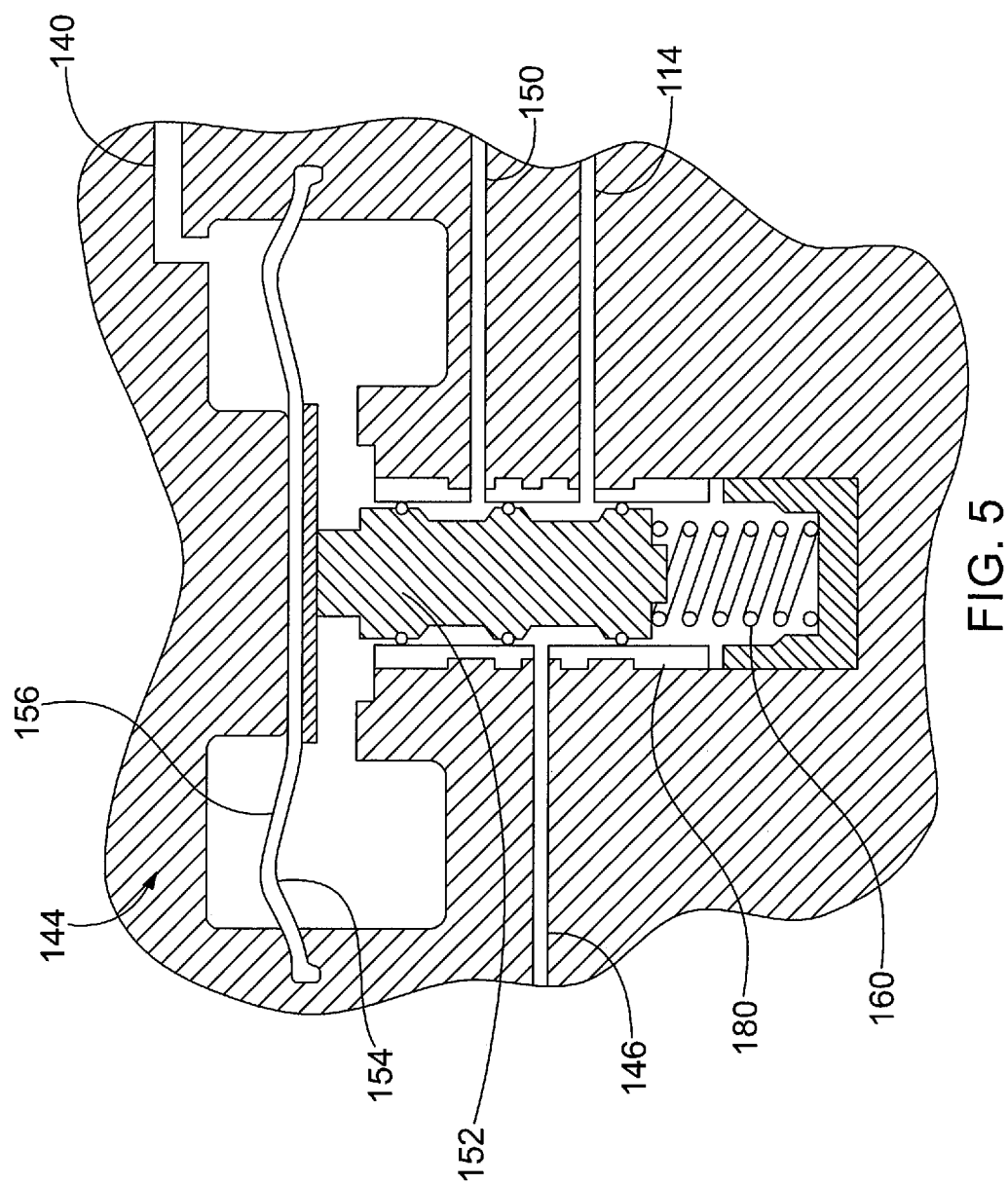
FIG. 5 is a schematic view of a switching valve according to one aspect of the present invention.

Referring to FIGS. 4, 6, and 7, the distributor valve 110 further includes a back flow check valve 176 in fluid communication with the reservoir passageway 116 when then the SAR check valve 138 is in the open position. The back flow check valve 176 is configured to prevent flow of air from the brake pipe to the reservoir. The spring force of the back flow check valve 176 closes the back flow check valve 176 to ensure brake pipe pressure cannot charge the reservoir through the service accelerated release valve 130. As discussed below, the reservoir is charged through a separate choked reservoir charging check valve assembly. The back flow check valve 176 will open when the valve member 132 moves to the second position and opens the SAR check valve 138 to allow the flow of reservoir pressure to the brake pipe.

When the distributor valve 110 of FIGS. 4-7 is set to direct release mode, the brake pipe pressure will flow through the bushing 166 of the service accelerated release valve 130, around the piston stem 162, unseat the SAR check valve 138, and flow to the top of the back flow check valve 176. As noted above, the back flow check valve 176 will remain closed due to the force of the back flow check valve spring force. During a brake release, brake cylinder exhaust pressure will feed the first side 170 of the diaphragm 136 of the service accelerated release valve 130 via the brake cylinder exhaust passageway 118 to move the valve member 132 from the first position to the second position thereby opening the SAR check valve 138. Reservoir pressure will then flow back into the brake pipe through the service accelerated release valve 130, which, in turn, opens the back flow check valve 176 to provide an open flow of reservoir pressure directly into the brake pipe. The reservoir pressure flowing directly back into the brake pipe provides a rapid increase in brake pipe pressure in each freight vehicles brake pipe line. This function leads directly to higher brake pipe pressure at each car, which allows for recharging of brake pipe pressure to occur at a faster rate. Once the pressure within the brake cylinder exhaust passageway 118 becomes low enough at the first side 170 of the diaphragm 136 of the service accelerated valve 130, the SAR check valve spring will close the SAR check valve 138 back on its seat thereby moving the valve member 132 from the second position to the first position. Further, the back flow check valve 176 will also close due to the spring force thereby completing the service accelerated release function.

When the distributor valve 110 is in the graduated release mode, the brake pipe pressure will flow through the bushing 166, around the piston stem 162, unseat the SAR check valve 138, and to the top side of the back flow check valve 176. The back flow check valve 176 is closed by the force of the spring of the back flow check valve 176 to ensure that brake pipe pressure cannot charge the reservoir pressure through the service accelerated release valve 130. The brake pipe pressure will flow through a bushing 180 of the switching valve 144, past the spool valve 152, and directly to the second side 148 of the diaphragm 136 of the service accelerated release valve 130. The brake pipe pressure acting on the second side 148 of the diaphragm 136 prohibits the piston stem 162 from moving downwards and the SAR check valve 138 from opening when the pressure in the brake cylinder exhaust passageway 118 builds on the first side 170 of the diaphragm 136 during a brake release when in the graduated release mode.

Referring to FIG. 6, the service accelerated release valve 130 is incorporated into a main portion 184 and connected to a pipe bracket 186 having a brake pipe port 188 in fluid communication with the brake pipe passageway 114, a signal port 190 in fluid communication with the signal passageway 140, a reservoir port 192 in fluid communication with the reservoir passageway 116, a working chamber port 194, a valve chamber port 196, a brake cylinder port 198, and an additional discharge port 200. Although the service accelerated release valve 130 is incorporated into a main portion of a distributor valve, other suitable arrangements may be utilized. In addition to the features discussed above, the main portion 184 further includes a reservoir charging check valve 202, a working chamber charging check valve 204, a brake cylinder pressure limiting valve 206, a three-stage brake cylinder control valve 208, a working chamber drain check valve 210, and an quick service limiting valve 212.

While several embodiments were described in the foregoing detailed description, those skilled in the art may make modifications and alterations to these embodiments without departing from the scope and spirit of the invention. Accordingly, the foregoing description is intended to be illustrative rather than restrictive.

The invention claimed is:

1. A brake distributor valve comprising:
a body defining a brake pipe passageway configured to be in fluid communication with a brake pipe, a reservoir passageway configured to be in fluid communication with a reservoir, and a reference pressure passageway configured to be in fluid communication with a reference pressure source; and
a service accelerated release valve comprising a valve member having a first position where the brake pipe passageway is isolated from the reservoir passageway and a second position where the brake pipe passageway is in fluid communication with the reservoir passageway, the valve member configured to supply pressure from the reservoir passageway to the brake pipe passageway during a brake release event, wherein the valve member is actuated between the first and second positions based on a pressure within the reference pressure passageway,
wherein the body defines a signal passageway configured to be in fluid communication with a signal pressure source, further comprising a switching valve having a first position where the service accelerated release valve is enabled and a second position where the service accelerated release valve is disabled, the switching valve moveable between the first position and the second position in response to the signal pressure source.

2. The brake distributor valve of claim 1, further comprising a back flow check valve in fluid communication with the reservoir passageway, the back flow check valve configured to prevent flow from the brake pipe to the reservoir during charging of brake distributor valve and allow flow from the reservoir to the brake pipe when the valve member of the service accelerated release valve is in the second position during a brake release event.

3. The brake distributor valve of claim 1, wherein the body defines a switching passageway in fluid communication with the service accelerated release valve and an exhaust passageway in fluid communication with ambient atmosphere, wherein the switching passageway is in fluid communication with the exhaust passageway while the switching valve is in the first position.

4. The brake distributor valve of claim 3, wherein the switching passageway is in fluid communication with the brake pipe passageway while the switching valve is in the second position.

5. The brake distributor valve of claim 3, wherein the switching valve comprises a spool valve having a diaphragm, the signal passageway in fluid communication with a first side of the diaphragm.

6. The brake distributor valve of claim 1, wherein the reference pressure passageway comprises a working chamber passageway configured to be in fluid communication with a working chamber and a working chamber reservoir in fluid communication with the working chamber passageway via a choke, the service accelerated release valve comprising a first diaphragm, a second diaphragm, and a check valve, the working chamber reservoir in fluid communication with a first side of the first diaphragm, the working chamber passageway in fluid communication with a second side of the first diaphragm and a first side of the second diaphragm, wherein the valve member of the service accelerated release valve moves from the first position to the second position based on a pressure differential between the working chamber passageway and the working chamber reservoir.

7. The brake distributor valve of claim 6, wherein the valve member is configured to open the check valve responsive to the valve member moving from the first position to the second position to place the reservoir passageway in fluid communication with the brake pipe passageway.

8. The brake distributor valve of claim 6, wherein the second side of the second diaphragm is in fluid communication with ambient atmosphere.

9. The brake distributor valve of claim 7, further comprising a back flow check valve in fluid communication with the reservoir passageway while the check valve is in an open position, the back flow check valve configured to prevent flow from the brake pipe to the reservoir.

10. The brake distributor valve of claim 1, wherein the reference pressure passageway comprises a brake cylinder exhaust passageway configured to be in fluid communication with a brake cylinder, the brake cylinder exhaust passageway in fluid communication with ambient atmosphere via a choke, the service accelerated release valve comprising a diaphragm and a SAR check valve, wherein the valve member of the service accelerated release valve moves from the first position to the second position based on a pressure within the brake cylinder exhaust passageway.

11. The brake distributor valve of claim 10, wherein the valve member is configured to open the check valve responsive to the valve member moving from the first position to the second position to place the reservoir passageway in fluid communication with the brake pipe passageway.

12. The brake distributor valve of claim 11, further comprising a back flow check valve in fluid communication with the reservoir passageway, the back flow check valve configured to prevent flow from the brake pipe to the reservoir.

13. The brake distributor valve of claim 10, wherein the body defines a signal passageway configured to be in fluid communication with a signal pressure source, the brake distributor valve further comprising a switching valve having a first position where the service accelerated release valve is enabled and a second position where the service accelerated release valve is disabled, the switching valve moveable between the first position and the second position in response to the signal pressure source.

14. The brake distributor valve of claim 13, wherein the body defines a switching passageway in fluid communication with a second side of the diaphragm of the service accelerated release valve and an exhaust passageway in fluid communication with ambient atmosphere, wherein, when the switching valve is in the first position, the switching passageway is in fluid communication with the exhaust passageway.

15. The brake distributor valve of claim 14, wherein the switching passageway is in fluid communication with the brake pipe passageway while the switching valve is in the second position.

16. The brake distributor valve of claim 13, wherein the switching valve comprises a spool valve having a diaphragm, the signal passageway in fluid communication with a first side of the diaphragm.

17. The brake distributor valve of claim 1, further comprising:
a pipe bracket comprising a brake pipe port in fluid communication with the brake pipe passageway of the body, a signal port in fluid communication with the signal passageway of the body, and a reservoir port in fluid communication with the reservoir passageway of the body.

18. The brake distributor valve of claim 17, wherein the reference pressure passageway comprises a brake cylinder exhaust passageway configured to be m fluid communication with a brake cylinder, the brake cylinder exhaust passageway m fluid communication with ambient atmosphere via a choke, the service accelerated release valve comprising a diaphragm and a check valve, wherein the valve member of the service accelerated release valve moves from the first position to the second position based on a pressure within the brake cylinder exhaust passageway and a pressure within the signal passageway.

19. The brake distributor valve of claim 18, wherein the pipe bracket further comprises a valve chamber port, a brake cylinder port, and an additional discharge port.

* * * * *